United States Patent
Yoshida et al.

(10) Patent No.: US 7,062,987 B2
(45) Date of Patent: Jun. 20, 2006

(54) BALL BEARING AND A CONTINUOUSLY VARIABLE SPEED TRANSMISSION OF BELT TYPE

(75) Inventors: Isamu Yoshida, Shizuoka-ken (JP); Keisuke Kazuno, Shizuoka-ken (JP)

(73) Assignee: NTN Corporation (JP)

( * ) Notice: Subject to any disclaimer, the term of this patent is extended or adjusted under 35 U.S.C. 154(b) by 192 days.

(21) Appl. No.: 10/299,345

(22) Filed: Nov. 19, 2002

(65) Prior Publication Data

US 2003/0096668 A1 May 22, 2003

(30) Foreign Application Priority Data

Nov. 19, 2001 (JP) .............................. 2001-353600

(51) Int. Cl.
*F16H 1/18* (2006.01)

(52) U.S. Cl. ........................ 74/424.88; 192/94; 474/39

(58) Field of Classification Search ............. 74/424.88, 74/424.82; 192/94; 474/35, 39
See application file for complete search history.

(56) References Cited

U.S. PATENT DOCUMENTS

| | | | | |
|---|---|---|---|---|
| 5,358,265 A | * | 10/1994 | Yaple | .............. 280/293 |
| 5,749,266 A | * | 5/1998 | Tsukada | ............... 74/89.44 |
| 5,782,135 A | * | 7/1998 | Kondo et al. | ............... 74/89.44 |
| 5,943,910 A | * | 8/1999 | Babinski | ................. 74/89.35 |
| 6,082,210 A | * | 7/2000 | Ise | ............... 74/424.83 |
| 6,499,374 B1 | * | 12/2002 | Ohga | ............... 74/424.82 |
| 6,691,837 B1 | * | 2/2004 | Kapaan et al. | .............. 188/72.1 |
| 2002/0019280 A1 | * | 2/2002 | Brown | .................. 474/35 |
| 2003/0051569 A1 | * | 3/2003 | Kapaan et al. | .......... 74/424.85 |
| 2003/0096668 A1 | * | 5/2003 | Yoshida et al. | ............... 474/39 |
| 2003/0106386 A1 | * | 6/2003 | Pacieri et al. | ............ 74/424.82 |
| 2003/0138172 A1 | * | 7/2003 | Yabe et al. | .................. 384/45 |
| 2003/0194160 A1 | * | 10/2003 | Yabe et al. | .................. 384/43 |
| 2003/0221502 A1 | * | 12/2003 | Okita et al. | ............. 74/424.88 |
| 2004/0043847 A1 | * | 3/2004 | Jonckheere et al. | ........... 474/8 |

FOREIGN PATENT DOCUMENTS

JP            8-33170           3/1996

* cited by examiner

*Primary Examiner*—David Fenstermacher
(74) *Attorney, Agent, or Firm*—Harness, Dickey & Pierce, P.L.C.

(57) ABSTRACT

A ball screw in a continuously variable speed transmission has an axially immovable pulley half (2) and axially movable pulley half (3) both mounted on a rotary shaft (4). The axially movable pulley half (3) is moved by a ball screw (20) so as to infinitely vary the belt wrapping radius and thus the transmission speed. A nut (22), forming one part of the ball screw (20), is immovably secured in both axial and rotational directions. A screw shaft (21), forming the other part of the ball screw (20), is movable in both axial and rotational directions. The screw shaft 21 is connected to the axially movable pulley half (3). The axially movable pulley half (3) is axially moved by rotating the screw shaft (21).

6 Claims, 6 Drawing Sheets

(a)

(b)

BALL BEARING AND A CONTINUOUSLY VARIABLE SPEED TRANSMISSION OF BELT TYPE

CROSS-REFERENCE TO RELATED APPLICATIONS

This application claims priority to Japanese Patent Application Nos. 2001-353600 filed Nov. 19, 2001, which application is herein expressly incorporated by reference.

FIELD OF THE INVENTION

The present invention relates, generally to a ball screw, and more particularly to a ball screw used as an actuator for driving an axially movable pulley half of a Continuously Variable speed Transmission (hereinafter referred to as a "CVT") for example used in an automobile.

BACKGROUND OF THE INVENTION

The ball screw comprises a screw shaft formed with a screw groove around the outer circumferential surface. A nut is formed with a screw groove on the inner circumferential surface. A plurality of balls are contained within a raceway formed by the opposite screw grooves of the screw shaft and the nut. The ball screw is used to convert a rotational force of the screw shaft (or the nut) to a thrust force of the nut (or the screw shaft) via the balls.

The ball, screw has a very high transmission efficiency due to the rolling contact of balls between the screw shaft and the nut. Thus, it is possible to convert the rotational motion to translational motion with a driving torque of about ⅓ that of the sliding screw. It is therefore possible to obtain a large thrust force by applying a small torque.

The CVT of the prior art is schematically shown in FIG. 5. The CVT comprises a pulley 50 on the input side and a pulley 51 on the output side, and a steel belt 52 wrapped around and extending between the pulleys 50 and 51. The input and output pulleys 50 and 51 are formed, respectively, by axially immovable pulley halves 50a and 51a and axially movable pulley halves 50b and 51b. The continuous speed variation can be achieved by axially shifting the axially movable pulley halves 50b and 51b and thus varying the belt wrapping radials of the input and output pulleys 50 and 51.

An actuator to shift the axially movable pulley halves 50b and 51b is formed by ball screws 53. As shown in FIG. 6(a), each ball screw 53 includes a screw shaft 54 and a nut 55 mounted thereon via a plurality of balls 58. The balls 58 are contained in a raceway formed by opposite screw grooves 56 and 57 so that they are infinitely circulated. These balls 58 are all load supporting balls having the same diameter as shown in FIG. 6(b).

The screw shaft 54 of the ball screw 53 is supported by a supporting member (not shown) formed integrally with a casing (not shown) so that the screw shaft 54 cannot be moved in both a rotational and axial direction. The nut 55 is supported movably in both a rotation and axial direction. Accordingly, the axially movable pulley halves 50b and 51b connected to the nuts 55 via bearings (not shown) can be translated along the screw shaft 54 by rotating the nuts 55 (see Japanese Patent Publication No. 33170/1996).

When an automobile provided with the CVT is running on a town street, the CVT is, in usual, frequently shifted in a narrow range between Lo-speed side and Hi-speed side. In this narrow range, the shifting range of the movable pulley halves 50b and 51b is very short.

Under the circumstances, the balls 58 suffer from friction and damage due to lack of lubrication in local regions especially between surfaces of adjacent balls 58 rotating in "counter" directions as shown by arrows in FIG. 6(b). This causes relative slippage between contacting points of adjacent balls. Thus, this lowers the mechanical efficiency of the ball screw 53 and diminishes the smooth speed change of an automobile.

In addition, since the nuts 55 have to be rotated in the CVT of the prior art to shift the axially movable pulley halves, ball circulating portions (not shown) formed in the nuts 55 are also rotated together with the nuts 55. Since a gap between the balls 58 and a raceway in the ball circulating portion is larger than that of the raceway formed by the screw grooves 56 and 57, the balls 58 cannot support the moment load and the radial load acting on the ball screw 53 when they are in the raceway in the ball circulating portion.

Accordingly it is necessary, in the CVT of the type of nut rotation, to increase the load supporting capacity or the rigidity of the ball screw 53 by enlarging the size of the balls in order to compensate for a deficiency of load supporting capacity. This diminishes a reduction of the weight and size of the CVT and makes a reasonable and fit design difficult.

SUMMARY OF THE INVENTION

It is, therefore, an object of the present invention to provide a ball screw that enables the reduction of weight and size of a CVT without reduction of the transmission efficiency as well as a CVT in which such a ball screw is incorporated.

According to the present invention, a ball screw includes a screw shaft formed with a screw groove around the outer circumferential surface. A nut is formed with a screw groove on the inner circumferential surface. A plurality of balls are contained within a raceway formed by the opposite screw grooves of the screw shaft and the nut. The screw shaft is formed as a hollow cylindrical member, and one end of the screw shaft is covered by one end of the nut.

The structure that the screw shaft is formed as a hollow cylindrical member, and one end of the screw shaft is covered by one end of the nut makes it possible to suppress a splash of lubricant due to the rotation of the screw shaft and to prevent a drop of the transmission efficiency. In addition it is possible to limit an amount of axial shift of the screw shaft with a light-weight and compact structure.

The dimension of the diameter "d" of the ball and the outer diameter "D" of the screw shaft is defined as a ratio of $d/D \leq 1/15$. This can reduce the entire length of the nut and makes it possible to provide a light-weight and compact ball screw without reducing the load supporting capacity and the transmission efficiency. Especially in the CVT used in an automobile, it is possible to achieve a light-weight and compact CVT of a reasonable and fit design.

The lead angle of the screw groove is smaller than 2°. This enables further reduction of the entire length of the nut without lowering the mechanical efficiency.

The balls comprise load supporting balls and spacer balls. One spacer ball is arranged between at least two load supporting balls. This makes the rotational directions of adjacent balls "following". Thus, this eliminates the relative slippage between contacting points of adjacent balls.

The diameter of the spacer balls is 10~100 μm smaller than that of the load supporting ball. This enables the gap between the balls and the screw grooves to be neither too much nor too less and thus brings smooth rolling of the spacer balls.

A separating seat is interposed between the balls. Each of the opposite surfaces of the separating seat is formed as a conical surface so as to contact the ball at a predetermined contacting angle. This causes the ball rotation "following" without substantially reducing the load supporting capacity. Thus, this eliminates the relative slippage of contacting points between adjacent balls and increase the efficiency of the ball screw. In addition since the lubricant is held by the separating seat, it is possible to reduce an amount of supply of the lubricant and to improve the lubricating characteristics of the ball screw.

An axially extending through aperture is formed between the opposite conical surfaces of the separating seat. This makes the minimum thickness of the separating seat large and further increases the lubricant holding capacity.

Further according to the present invention, a continuously variable speed transmission (CVT) of belt type includes an axially immovable pulley half and axially movable pulley half both mounted on a rotary shaft. The axially movable pulley half is moved by a ball screw so as to infinitely vary the belt wrapping radius. Thus, the transmission is characterized in that the ball screw is formed by a nut forming one part of the ball screw which is immovably secured in both axial and rotational directions. A screw shaft forms the other part of the ball screw and is movable in both axial and rotational directions. The screw shaft is connected to the axially movable pulley half. The axially movable pulley is axially moved by rotating the screw shaft.

Accordingly, the continuously variable speed transmission arranges the ball circulating portion of nut side of lesser load supporting ability at a no load supporting side when the axially movable pulley halves are axially shifted. Accordingly it is possible to prevent a ball vibration due to a gap increase within the ball circulating portion and due to translation of balls from the screw groove to the ball circulating portion or from the ball circulating portion to the screw grooves.

The axially movable pulley half is connected rotatably to the screw shaft via an interposed bearing. This makes the axial dimension of the CVT compact without reducing the rigidity of the ball screw itself.

One end of the screw shaft is secured to a connecting member. The connecting member has a flange portion radially outwardly extending beyond the outer diameter of the nut and a cylindrical portion axially extending around the outer circumferential surface of the nut. A gear for transmitting rotationally driving force to the screw shaft is secured to the outer circumferential surface of the cylindrical portion of the connecting member. This can reduce the entire length of the screw shaft by extending the thread length of the screw shaft and thus make the axial dimension of the CVT compact.

The length of the cylindrical portion of the connecting member is longer than the axial stroke of the nut. This makes it possible to cover the outer circumferential side of an annular space made vacant due to the relative movement of the nut. This prevents splash of the lubricant.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 (*b*) is a partially enlarged schematic section view of the ball screw of FIG. 6 (*a*).

DETAILED DESCRIPTION OF THE PREFERRED EMBODIMENTS

The following description of the preferred embodiment(s) is merely exemplary in nature and is in no way intended to limit the invention, its application, or uses.

Figure 1:
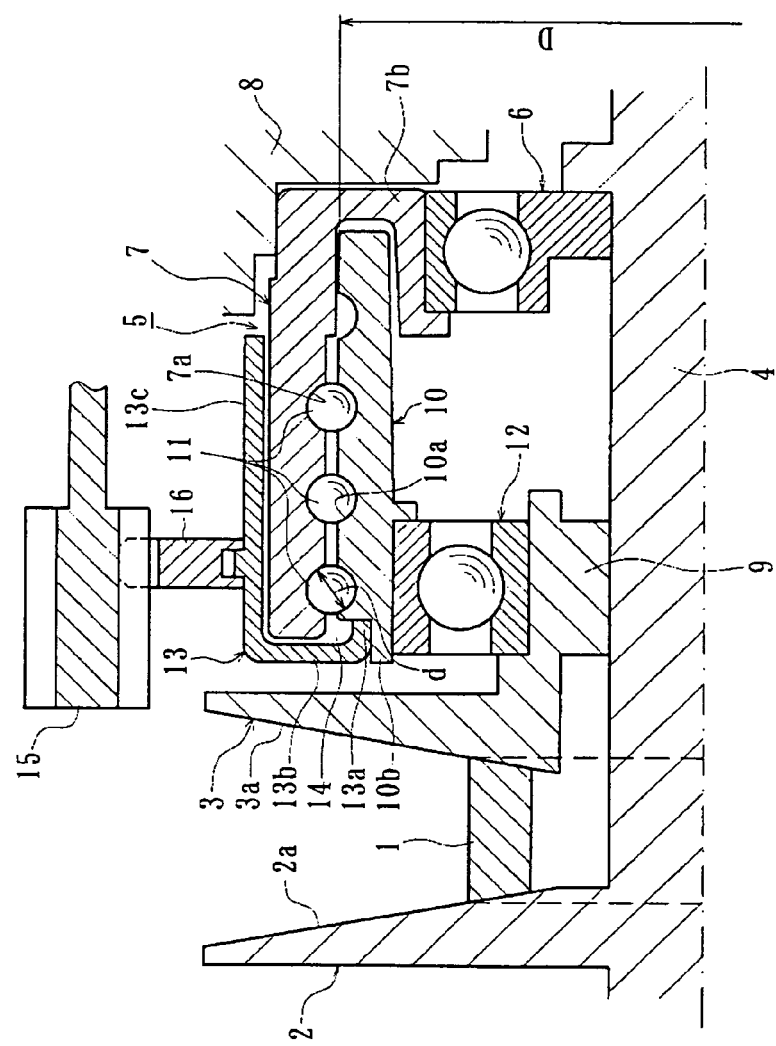
FIG. 1 is a longitudinal section view of one embodiment of a CVT using a ball screw of the present invention.
Figure 2:
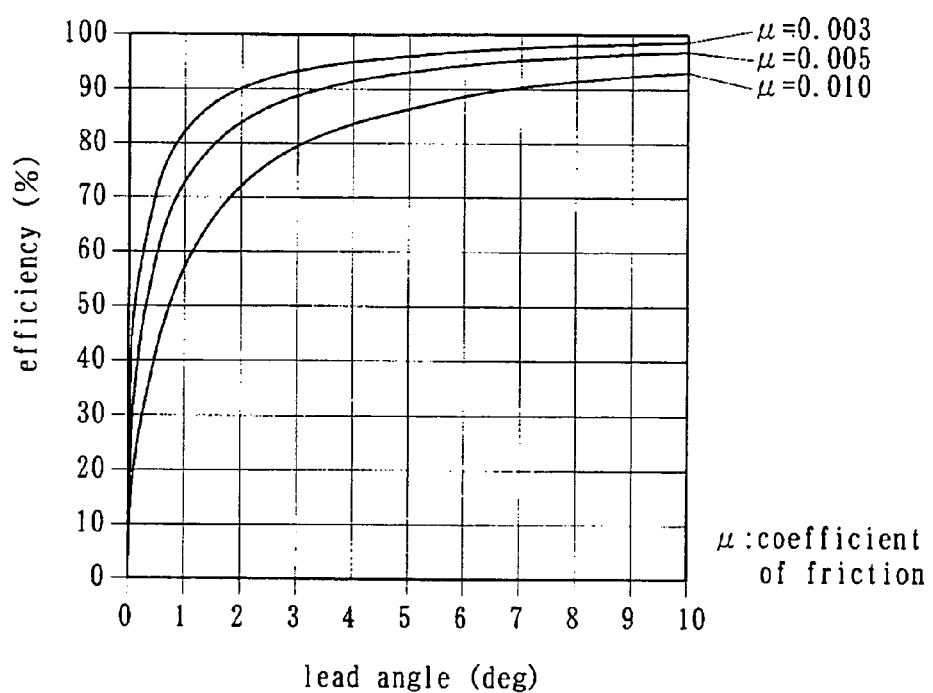
FIG. 2 is a diagrammatic view showing a relation between the transmission efficiency and the lead angle of a ball screw.

FIG. 1 is a longitudinal section view of one embodiment of a CVT using a ball screw of the present invention. The CVT has a rotary shaft 4 which mounts an axially immovable pulley half 2 and an axially movable pulley 3. Belt receiving surface 2*a* and 3*a* receive power transmission belt 1. The surfaces 2*a* and 3*a* are opposite one another. The belt wrapping radius of the power transmission pulley 1 can be varied continuously or infinitely by axially shifting the movable pulley half 3 with a ball screw 5. In the illustrated embodiment, although it is shown that the immovable pulley half 2 is formed integrally with the rotary shaft 4, it may be possible to form the immovable pulley half 2 separately from the rotary shaft 4 and secure it on the rotary shaft 4 by any way known in the art.

A nut 7 is adapted to be secured to a housing 8 of the CVT. The nut has a radially extending connecting portion 7*b*. The connecting portion 7*b* covers one end of a screw shaft 10 and limits an amount of shift of the screw shaft 10 in one direction in order to prevent fall out of balls 11 from the raceway and splash of lubricant adhered to the screw shaft 10. The nut 7, secured on the housing 8, is also supported on the rotary shaft 4 rotatable relative to the shaft 4 via a ball bearing 6 fitted in the inner circumferential surface of the connecting portion 7*b*

The axially movable pulley half 3 has a cylindrical portion 9 on its back side mounted on the rotary shaft 4, via a slide key. The pulley half 3 can be axially moved along the shaft 4, however, it cannot be rotated relative to the shaft 4. The slide key may be replaced by any other means having lesser sliding resistance such as a linear rolling bearing.

The ball screw 5 includes the screw shaft 10 formed with a helical screw groove 10*a* on its outer circumferential surface. The nut 7 is adapted to fit around the screw shaft 10. The nut 7 is formed with a helical screw groove 7*a* on its inner circumferential surface. A plurality of balls 11 are contained within a raceway formed between the opposite screw grooves 10*a* and 7*a* of the screw shaft 10 and the nut 7. The screw shaft 10 is a hollow cylinder. The screw shaft 10 is supported on the cylindrical portion 9 of the axially movable pulley half 3 via a ball bearing 12 fitted in the inner circumferential surface of the screw shaft 10.

An annular connecting member 13 is securely fitted on a stepped portion 10b of the screw shaft 10. A knurl may be formed on the outer circumferential surface of the stepped portion 10b to increase the caulking force of the connecting member 13.

The connecting member 13 may be press formed of steel sheet and includes a fitting portion 13a, fitted on the stepped portion 10b; a flange portion 13b, radially outwardly extending from the fitting portion 13a; and a cylindrical portion 13c, axially extending from the flange portion 13b to cover the outer circumferential surface of the nut 7. The nut 7 is received within an annular space 14 formed by the inner circumferential surface of the cylindrical portion 13c of the connecting member 13 and the outer circumferential surface of the screw shaft 10.

A gear 16 is secured to the connecting member 13 around the outer circumferential surface of the cylindrical portion 13c. The gear 16 slidably mates with a gear 15 driven by a motor (not shown). The screw shaft 10 is driven by the motor, via the gears 15 and 16, and the connecting member 13. The gear 16 may be made of plastic material having a wear resistance and a low coefficient of friction. Thus, its teeth are smoothly slidable against those of the gear 15.

When driven by the motor, the screw shaft 10, rotatably supported by the ball bearing 12, is rotated around the axially movable pulley 3 and simultaneously axially moved relative to the secured nut 7 to shift the axially movable pulley half 3 toward the axially immovable pulley half 2. Accordingly, the distance between the belt receiving surface 3a of the movable pulley half 3 and the opposed belt receiving surface 2a of the immovable pulley half 2 is reduced. Thus, the belt wrapping radius of the belt 1 is increased. When the screw shaft 10 is reversely rotated by the motor, the distance between the belt receiving surfaces 2a and 3a is spread and thus the belt wrapping radius is reduced.

Figure 5:
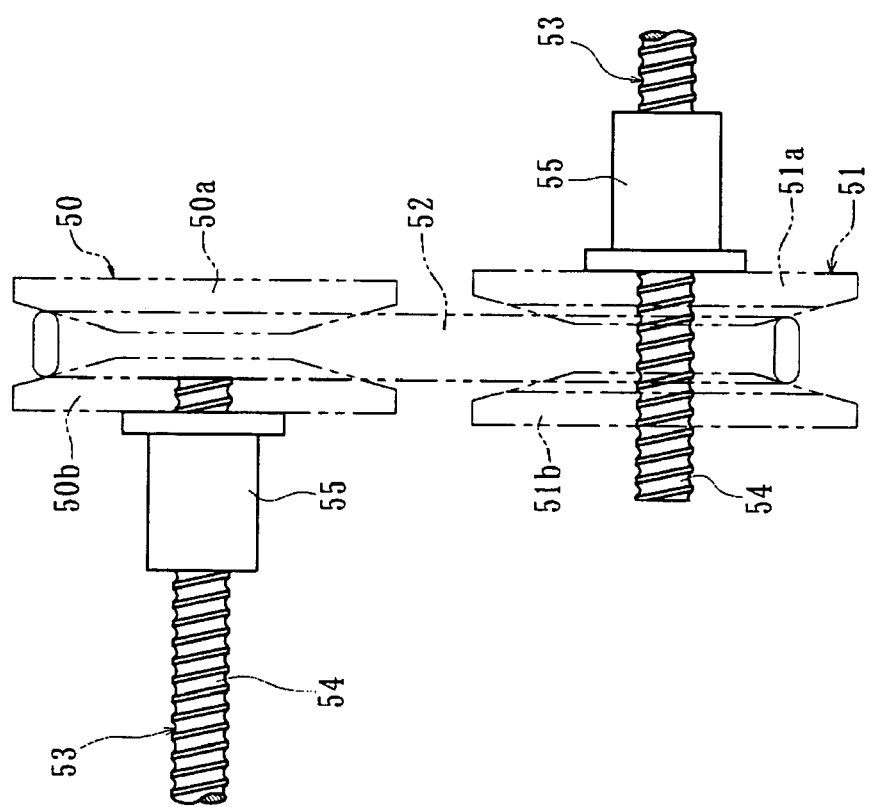
FIG. 5 is a schematic view of a CVT of the prior art.
Figure 6:
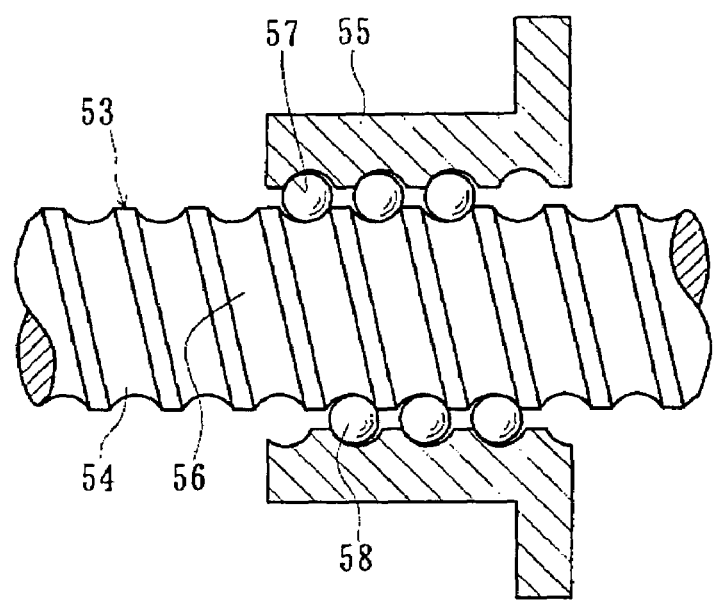
FIG. 6 (*a*) is a section view of a ball screw used in a CVT of the prior art.
Figure 6:
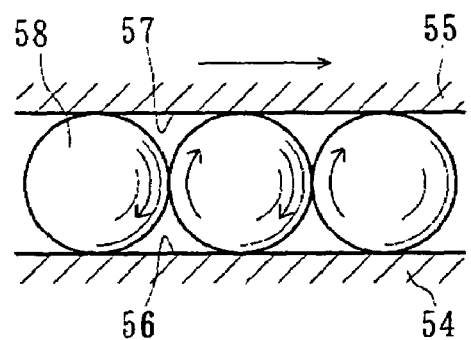

In the ball screw 5, it is generally necessary to have the lead angle of the screw grooves 7a and 10a substantially large in order to keep a preferable working performance. Since the transmission efficiency of the ball screw 5 is suddenly lowered, as shown in FIG. 5, if the lead angle of the screw grooves is set smaller than about 2°, the lead angle is usually set at an angle larger than 2°.

It is necessary to increase the diameter of balls 11 when the diameter of the screw shaft 10 is increased since the torque variation is increased as well as the working torque performance is lowered when the number of the balls arranged within one circulation passage is increased. Ordinarily, the diameter "d" of the ball 11 and the outer diameter "D" of the screw shaft 10 is experientially set as having a relation "d/D>1/15".

In the ball screw 5 of the CVT shown in FIG. 1, not only the entire length of but the outer diameter of the nut 7 are increased since the outer diameter "d" of the balls 11 as well as the lead angle are increased when the outer diameter "D" of the screw shaft 10 is increased. Accordingly, further improvements should be done in order to reduce the weight and size of the CVT.

Figure 3:
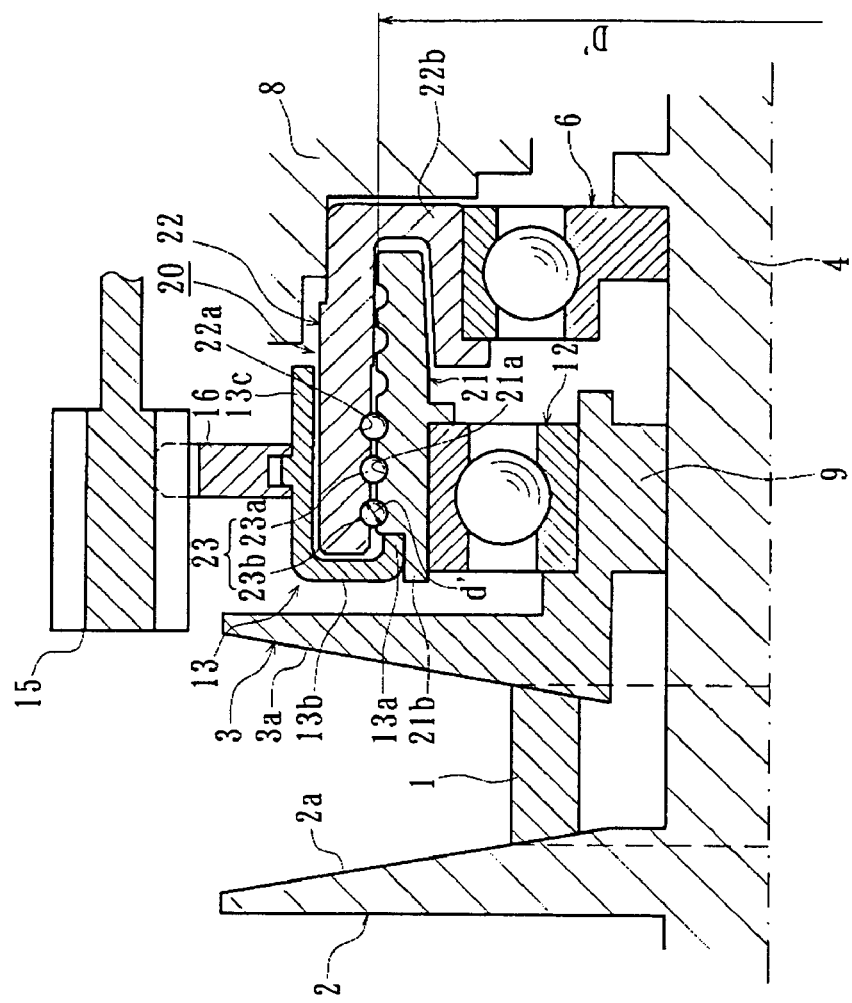
FIG. 3 is a longitudinal section view of another embodiment of a CVT using a ball screw of the present invention.

FIG. 3 is a longitudinal section view of the other embodiments of a CVT using a ball screw of the present invention. Same reference numerals as those used in FIG. 1 are also used in FIG. 3 as to same elements used in FIG. 1. The ball screw 20 used in the CVT includes a screw shaft 21 formed with a helical screw groove 21a on its outer circumferential surface. A nut 22 is fitted around the screw shaft 21 and has a helical screw groove 22a on its inner circumferential surface. A plurality of balls 23 are contained within the raceway formed between the opposite screw grooves 21a and 22a of the screw shaft 21 and the nut 22. The screw shaft 21 is formed by a hollow cylinder and is rotatably supported on the cylindrical portion 9 of the axially movable pulley half 3 via the ball bearing 12.

The nut 22 is secured to the housing 8 of the CVT and has a radially extending connecting portion 22b for covering one end of the screw shaft 21. The nut 22, secured on the housing 8, is also supported on the rotary shaft 4 rotatable relative to the shaft 4 via the ball bearing 6 fitted in the inner circumferential surface of the connecting portion 22b.

In this embodiment, the ball 23 is formed as having a remarkably small diameter "d'" and a relation "d'/D'≦1/15" relative to an outer diameter "D'" of the screw shaft 21. The reduction of the size of the ball 23 enables the reduction of the lead angle and thus it is set smaller than 2°

Although it causes a problem of lowering the transmission efficiency of the ball screw 20 when reducing the lead angle smaller than 2°, this problem can be solved by forming the balls 23 from two kinds of balls. Load supporting balls 23a support the bearing load and spacer balls 23b, having a smaller diameter than that of the load supporting balls 23a, are arranged so that one of the spacer balls 23b is interposed between at least two load supporting balls 23a. This arrangement, of one spacer balls 23b between at least two load supporting balls 23a, brings a "following" rotation (not a "counter" direction) between mutually adjacent balls 23a and 23b. Thus, this eliminates the relative slippage between contacting points of the balls 23a and 23b. Accordingly, it is possible to increase the efficiency of the ball screw.

The diameter of the spacer ball 23b is smaller than that of the load supporting ball 23a preferably by 10~100 μm, more preferably 20~50 μm. If the difference of the diameter between the balls 23a and 23b is too small such as less than 10 μm, it is difficult to obtain the effect of eliminating the relative slippage. On the contrary, if the difference of the diameter between the balls 23a and 23b is too large such as more than 100 μm, the gap between the screw grooves 21a and 22a and the spacer balls 23b becomes too large to smoothly roll and thus it would be impossible to achieve smooth actuation of the ball screw 20.

In order to prevent the reduction of the load supporting capacity due to reduction of ball size, it is preferable to appropriately select a ratio of the spacer ball 23b and the load supporting ball 23a, for example, 1:2 or 1:3 other than 1:1.

Figure 4:
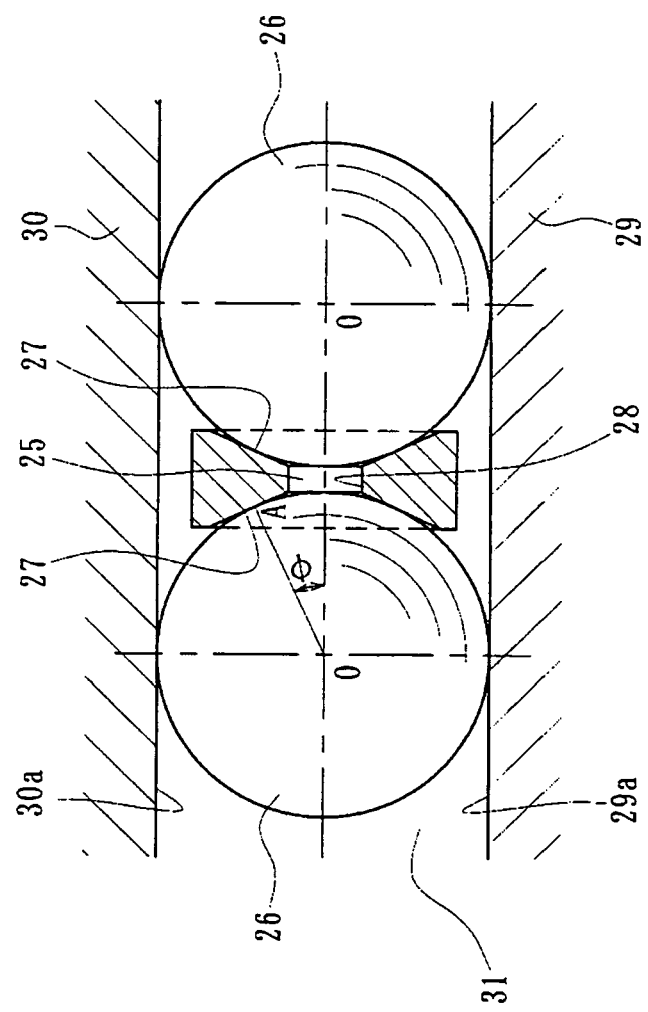
FIG. 4 is a partially enlarged section view of a ball screw of the present invention.

The spacer balls 23b can be replaced by separating seats 25 interposed between balls 26 and 26 as shown in FIG. 4. The separating seats 25 are formed by a ring shaped configuration having concave surfaces 27 on opposite surfaces that contact the balls 26 and 26. An axially extending through aperture 28 is formed between the concave surfaces 27. Similarly to the spacer balls 23b, the separating seats 25 prevent the direct contact of balls 26 contained within the raceway 31 formed by screw grooves 29a and 30a of the screw shaft 29 and the nut 30. The seats 25 also achieve the smooth rolling of balls 26.

The concave surface 27 of the separating seat 25 may be formed as either a conical surface or a concave spherical surface. In order to achieve stable pose of the separating seat 25 and smooth rolling of the balls 26, the separating seat 25 should be contacted with the balls at a predetermined contacting angle ø. The contacting angle ø is an angle formed by a line connecting the center "0" of the ball 26 and a contacting point "A" and a line connecting centers "0—0" of the adjacent balls 26 and is preferably a range of 20~−30°.

The diameter of the through-aperture 28 is 30% or less of the diameter of the ball 26. If the diameter of the through-passage 28 is larger than that range, the rigidity of the spacer seat 25 will be insufficient. On the contrary, if the diameter of the through-passage 28 is larger than that range, the wall thickness forming the through-passage 28 will become too thin to easily manufacture the spacer seat 25. The provision of the through passage 28 enables holding of lubricant as well as reduction the distance between balls 26. Accordingly, it is possible to increase the load supporting capacity of the ball screw as compared with the spacer ball 23b mentioned above.

The outer diameter of the separating seat 25 is 50~80% of the diameter of the ball 26. If the outer diameter is out of this range, the pose of the separating seat 25 will become unstable and thus contact the screw grooves 29a and 30a due to the presence of a gap between the mutually adjacent balls 26, which would cause the torque increase.

The separating seat can be made of either sintered metal or plastic material having self-lubricating property. Such a material includes for example polyimide (PI) or polyamide (PA) reinforced by any member. The material having high lubricity includes solid self lubricating component such as ultra-high-molecular-weight polyolefin dispersed with lubricating components such as lubricating oil or grease. More particularly, such a material can be made by mixing 95~1 weight % ultra-high-molecular-weight polyolefin powder and 5~99 weight % lubricating component, introducing this mixture into a mold, heating the mixture in the mold to a temperature higher than the gelling temperature of ultra-high-molecular weight polyolefin, and finally cooling the mixture. The ultra-high-molecular-weight polyolefin powder includes powders of polyethylene, polypropylene, polybutene, or copolymers of these materials, or mixtured powders of these materials each having average molecular weight of about $1\times10^6 \sim 5\times10^6$.

Ordinarily, the ball screw is provided with a ball circulating portion (not shown). There are several types of structures of ball circulating portion, for example, a return tube type where the ball circulating portion is formed on the outer circumferential portion of the nut; a guide plate type where the ball circulating portion is formed on the inner circumferential portion of the nut; a "top" type where the ball circulating portion is formed on the inner circumferential portion of the nut and the balls are returned within a raceway formed by connecting mutually adjacent screw grooves; and an end cap type where the ball circulating portion is formed on the end of the nut and the balls are translated in a reversed manner into an axially extending through passage of the nut. The present invention can be applied to any one of these types. However, the guide plate type or the "top" type which does not have any projection on the outer circumferential portion is preferable.

The present invention has been described with reference to the preferred embodiment. Obviously, modifications and alternations will occur to those of ordinary skill in the art upon read and understanding the preceding detailed description. It is intended that the present invention be construed as including all such alternations and modifications insofar as they come within the scope of the appended claims or the equivalents thereof.

What is claimed is:

1. A ball screw comprising:
   a screw shaft formed with a screw groove around an outer circumferential surface;
   a nut formed with a screw groove on an inner circumferential surface; and
   a plurality of balls contained within a raceway formed by the opposite screw grooves of the screw shaft and the nut; said screw shaft is formed as a hollow cylindrical member and one end of the screw shaft is covered by one end of the nut and the dimension of a diameter "d" of the ball and an outer diameter "D" of the screw shaft is defined as having a ratio $d/D \leq 1/15$.

2. The ball screw according to claim 1, wherein the lead angle of the screw groove is smaller than 2°.

3. The ball screw according to claim 1, wherein a separating seat is interposed between the balls, and each of opposite surfaces of the separating seat is formed as a conical surface so as to contact the ball at a predetermined contacting angle.

4. The ball screw according to claim 3, wherein an axially extending through aperture is formed between the opposite conical surfaces of the separating seat.

5. A ball screw comprising:
   a screw shaft formed with a screw groove around an outer circumferential surface;
   a nut formed with a screw groove on an inner circumferential surface; and
   a plurality of balls contained within a raceway formed by the opposite screw grooves of the screw shaft and the nut; said screw shaft is formed as a hollow cylindrical member and one end of the screw shaft is covered by one end of the nut and the balls comprise load supporting balls and non-load carrying spacer balls, one spacer ball is arranged between at least two load supporting balls so that the load bearing balls rotate in the same direction.

6. The ball screw according to claim 5, wherein the diameter of the spacer ball is 10~100 μm smaller than that of the load supporting ball.

* * * * *